United States Patent [19]

Huang

[11] Patent Number: 5,035,460
[45] Date of Patent: Jul. 30, 1991

[54] AUTOMOBILE WINDOW PROTECTOR

[76] Inventor: En L. Huang, 1280 Price St., Pomona, Calif. 91767

[21] Appl. No.: 420,926

[22] Filed: Oct. 13, 1989

[51] Int. Cl.⁵ ............................................... B60J 3/00
[52] U.S. Cl. ................................. 296/95.1; 296/97.7; 160/370.2
[58] Field of Search ................... 296/95.1, 97.7, 97.8, 296/136, 141; 150/166, 168; 160/370.2, DIG. 2, 329

[56] References Cited

U.S. PATENT DOCUMENTS

| | | | |
|---|---|---|---|
| 1,372,128 | 3/1921 | Ferguson | 160/329 |
| 1,475,647 | 11/1923 | Naterman | 160/370.2 X |
| 1,732,447 | 10/1929 | Crane . | |
| 1,790,333 | 1/1931 | Tubman . | |
| 1,808,652 | 6/1931 | Gump . | |
| 2,065,242 | 12/1936 | Omerly, Jr. | 160/370.2 |
| 2,489,901 | 11/1949 | Kocinski | 160/370.2 X |
| 2,596,836 | 5/1952 | Bruhl . | |
| 2,598,770 | 6/1952 | Drozt | 160/DIG.2 X |
| 2,599,066 | 6/1952 | Osborn | 160/370.2 |
| 2,614,630 | 10/1952 | Moszelt | 160/370.2 |
| 2,751,977 | 6/1956 | Pinkerton | 160/370.2 X |
| 2,843,421 | 7/1958 | Shelton | 160/370.2 X |
| 2,979,129 | 4/1961 | Kethum | 160/370.2 |
| 3,042,111 | 7/1962 | Wytovich | 160/370.2 X |
| 3,046,048 | 7/1962 | Cheney | 160/370.2 X |
| 3,184,264 | 5/1965 | Ealey et al. | 160/370.2 X |
| 3,336,969 | 8/1967 | Marchman . | |
| 4,560,245 | 12/1985 | Sarver . | |
| 4,561,039 | 3/1987 | Richards . | |
| 4,647,102 | 3/1987 | Ebrahimzadeh . | |
| 4,671,558 | 6/1987 | Cline . | |
| 4,736,980 | 4/1988 | Eubanks . | |
| 4,763,947 | 8/1988 | Gregg . | |
| 4,775,180 | 10/1988 | Phillips . | |
| 4,784,215 | 11/1988 | Sing | 160/370.2 X |
| 4,784,426 | 11/1988 | Mannisto-Iches . | |
| 4,790,591 | 12/1988 | Miller . | |
| 4,815,784 | 3/1989 | Zheng . | |
| 4,818,007 | 4/1989 | Mahoney . | |
| 4,862,943 | 9/1989 | Shafia | 160/370.2 X |

FOREIGN PATENT DOCUMENTS

| | | | |
|---|---|---|---|
| 073216 | 9/1960 | France | 296/95.1 |
| 376009 | 4/1964 | Switzerland | 296/95.1 |

Primary Examiner—Margaret A. Focarino
Assistant Examiner—Joseph D. Pape
Attorney, Agent, or Firm—Cislo & Thomas

[57] ABSTRACT

An automobile window protector comprises a substantially planar, generally rectangular sheet of flexible material held in an open configuration by an elongate curved strip of spring-like material attached to the sheet. Suitable shapes for the elongate strip include an arcuate shape, an arcuate shape with a flattened midportion, a U-shape, a C-shape, and a generally rectangular or oval closed loop. The window protector can be reduced to a compact configuration by twisting and folding it upon itself. A loop of elastic material attached to a midpoint of one of the longer sides of the sheet serves to hold the protector in its compact configuration when the loop is slipped over the folded protector. At or near each corner of the protector is a strip having a connector at its distal end to facilitate attachment of the shield to an automobile. In an alternative embodiment, the ends of the strip of spring-like material have mating connectors attached to them, to secure the protector in its folded, compact configuration. At least one of the major surfaces of the window protector is adapted to reflect light and heat radiation from the sun to prevent it from entering the interior of an automobile. When attached to an outside window, the protector prevents buildup of ice, snow, or dew on the window surface.

24 Claims, 6 Drawing Sheets

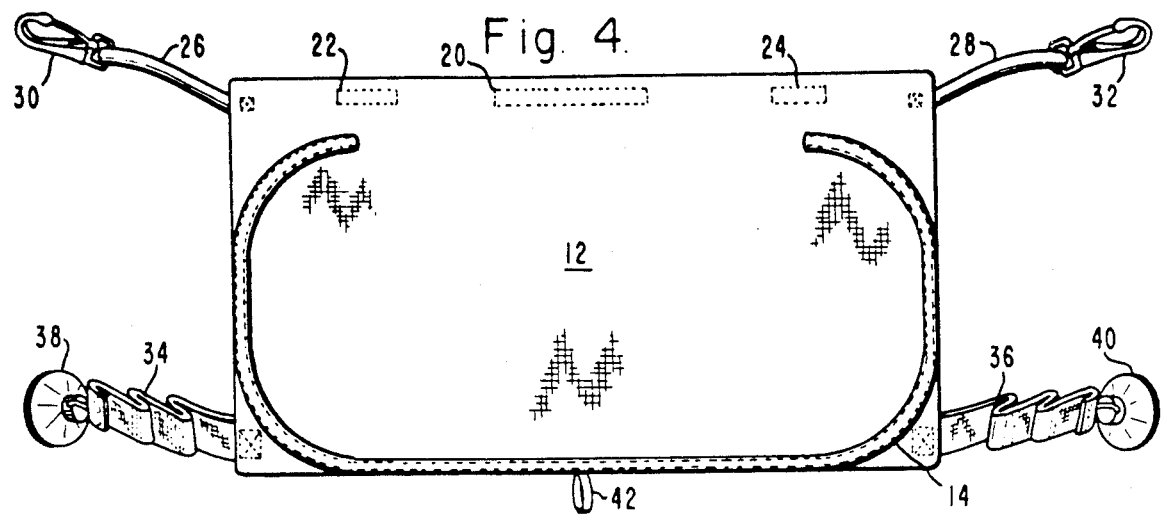
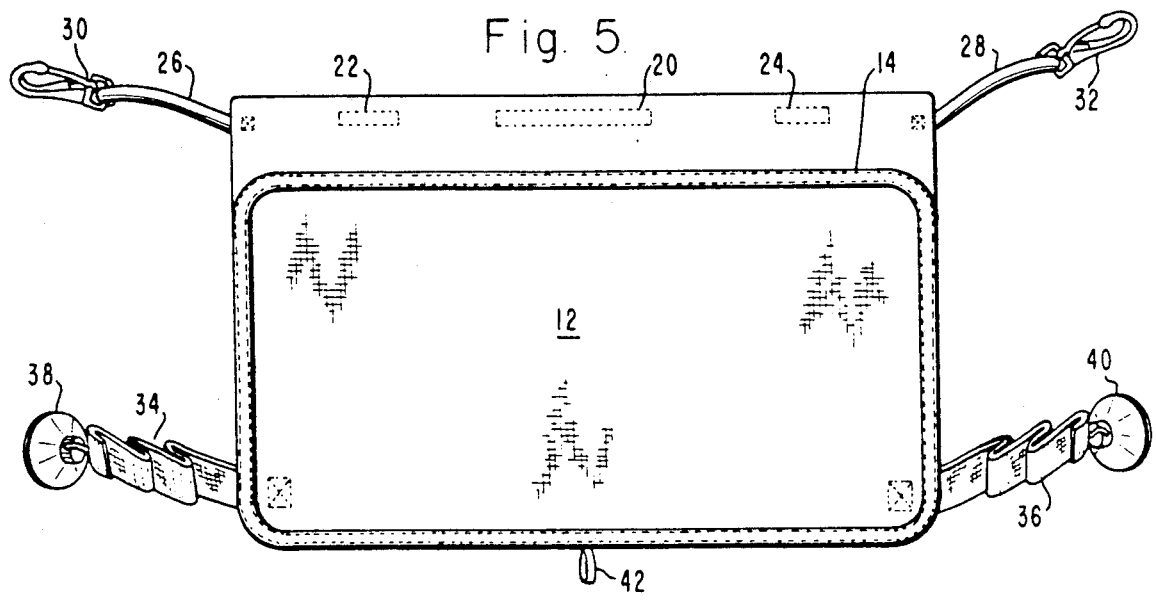
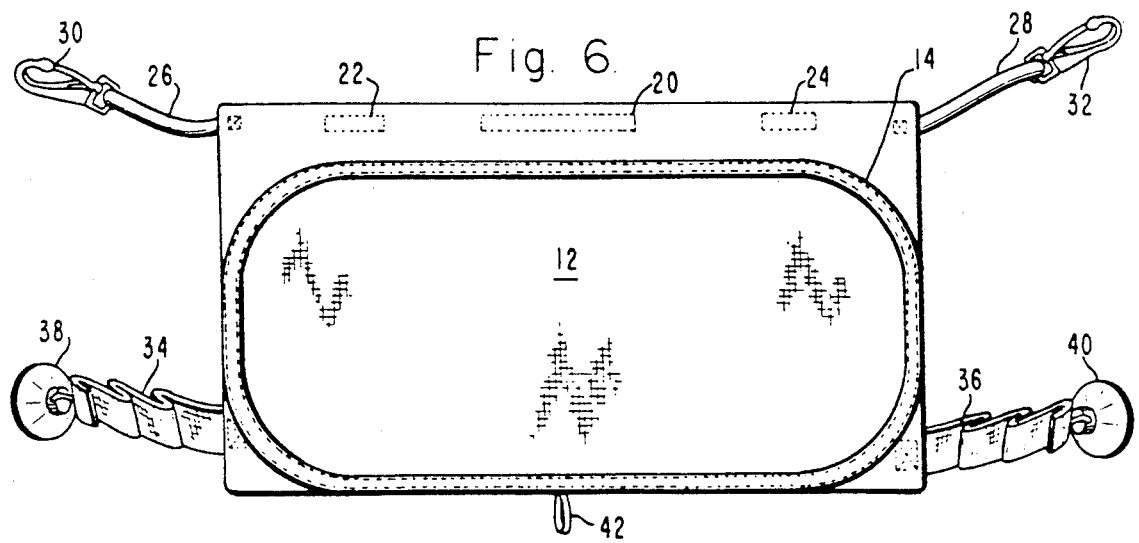

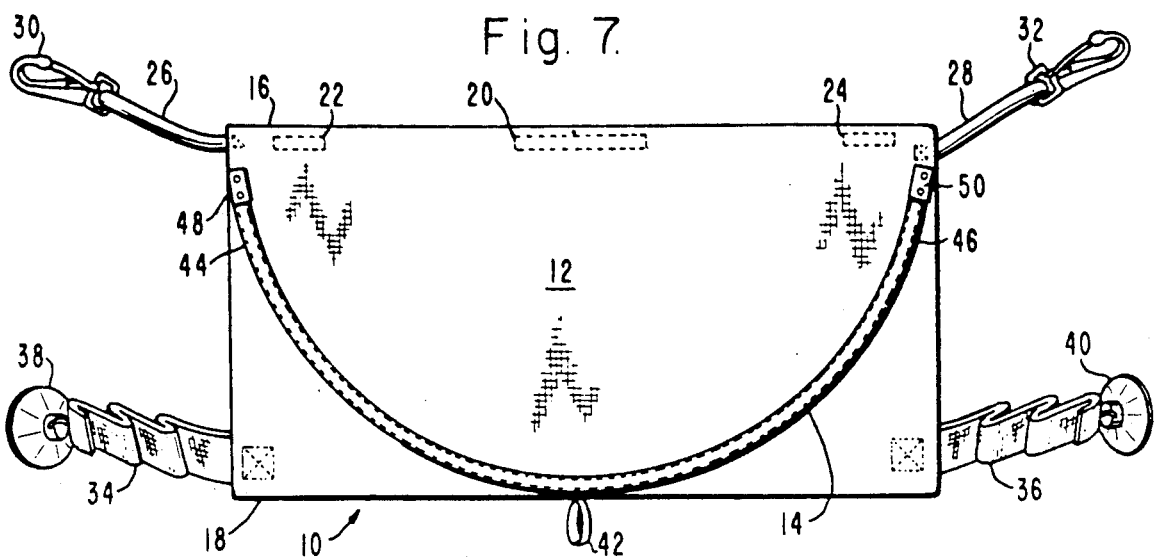
Fig. 7.
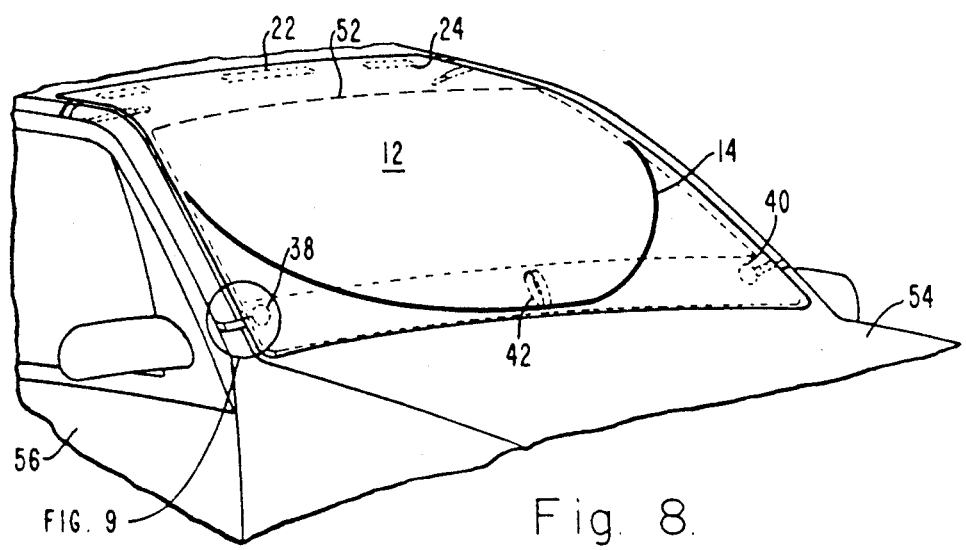
Fig. 8.
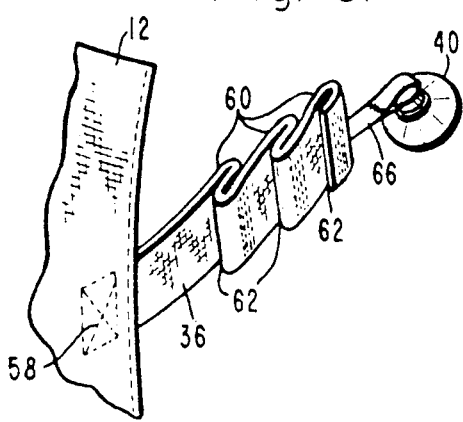
Fig. 9.
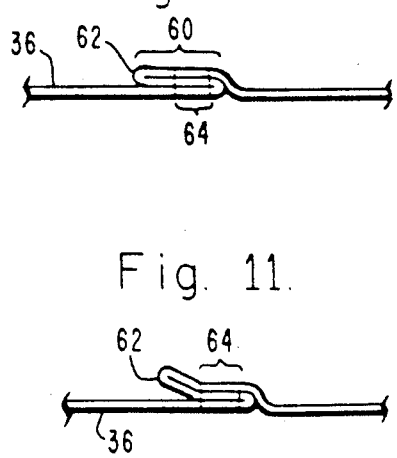
Fig. 10.
Fig. 11.

AUTOMOBILE WINDOW PROTECTOR

BACKGROUND OF THE INVENTION

This invention relates to devices for protecting the exterior or interior of a automobile which are placed on the outside or inside of an automobile window. In particular, this invention is directed to a protective device which can be mounted on the outside or inside of an automobile window to protect the interior of the automobile from sunlight and/or to protect the outer surface of the window against the elements.

There exists a need for a device which can not only serve as a sun shield for an automobile but also as protection of an automobile window against the buildup of ice, snow, or dew. Ideally such a window protection device could be folded into a compact configuration when not in use, be adjustable to the size of an individual automobile window, be inexpensive to manufacture, be rugged and durable in construction, and be easy to install or remove from an automobile.

SUMMARY OF THE INVENTION

In accordance with the invention, an automobile window protector is provided which has all the desirable features mentioned above.

It is an object of the present invention to provide an automobile window protector comprising generally rectangular sheet of flexible material with a curved strip of spring-like material attached to maintain an open shape of the protector.

Another object of the invention is to provide an automobile window protector which can assume either an extended, substantially planar configuration or a folded, compact, generally circular configuration.

It is an additional object of the present invention to provide an automobile window protector which has a foreshortenable portion along its top edge to allow installation on or inside windows of various sizes.

It is yet another object of the present invention to provide an automobile window protector which can be twisted and folded one or more times upon itself into a compact configuration for easy handling and storage.

Another object of the present invention is to provide an automobile window protector which can be easily mounted on the automobile by means of magnets, suction cups, hooks, clips, or other types of connectors.

Still another object of the present invention is to provide an automobile window protector which has at least one of its major surfaces adapted to reflect light and heat radiation from the sun.

Yet another object of the present invention is to provide an automobile window protector made substantially of a densely-woven fabric with one major surface metallized.

One more object of the present invention is to provide an automobile window protector having a generally rectangular shape with four or more straps attached near corners to facilitate attachment of the protector to the automobile.

It is still one more object of the present invention to provide an automobile window protector which can be attached to the exterior of the automobile by means of straps of webbing material having folded-over portions partly attached to each other to leave looped tabs, each such tab serving to hold the protector securely against the car when blown by the wind, the straps being held inside closed doors to prevent the protector from being blown off the car.

In accordance with the present invention in a preferred embodiment, an automobile window protector comprises a substantially planar, generally rectangular sheet of flexible material held in an open configuration by a curved strip of spring-like material attached to the sheet. The actual shape of the strip of spring-like material can range from an arcuate one substantially spanning the length of the sheet to a closed loop generally following the perimeter of the sheet.

The strip of spring-like material can be twisted and folded one or more times upon itself to reduce the window protector to a compact configuration. A loop of elastic material attached to a midpoint of one of the longer sides of the sheet serves to hold the protector in its compact configuration when the loop is slipped over the folded protector.

A central portion of the opposite longer side of the protector has a foreshortenable strip of material to allow adaptation of the window protector to smaller windshields. At or near each corner of the window protector is attached a strip having a connector of some sort at its distal end to facilitate attachment of the shield to an automobile.

Suitable connectors can comprise suction cups, hooks, or clips of various sorts. Additionally, strips of flexible magnetic material forming part of the window protector near an edge between the center and corners of a long side can be used to attach the protector to metallic portions of the automobile above the window.

In an alternative embodiment when the strip of spring-like material does not form a closed figure, the ends of the strip have mating connectors attached to them, so that the window protector can be secured in its folded, compact configuration by joining the connectors. As before, the strip of spring-like material can be twisted and folded upon itself to provide a collapsed, compact configuration before the connectors are joined.

The mating connectors can comprise either a rod and barrel type connection (as for a fountain pen), an overlapping spring-clip connection, or a connection in which one connector has a pair of generally parallel members with outward lateral bumps which are engaged by detents or holes in the sides of the other connector.

For attachment of the window protector to the exterior of an automobile, two of the connector straps comprise folded-over and partly sewn portions leaving looped tabs adjacent each such portion which when blown by the wind serve to hold the window protector more securely against the automobile.

The automobile window protector of the present invention has at least one reflective major surface to prevent light and heat radiation from the sun from entering the interior of an automobile. The automobile window protector can be attached to the automobile outside a window to prevent buildup of ice, snow, or dew on the window surface.

BRIEF DESCRIPTION OF THE DRAWINGS

FIG. 4 is a top plan view of an automobile window protector in which the strip of spring-like material is generally C-shaped.

FIG. 5 is a top plan view of an automobile window protector in which the strip of spring-like material is a generally rectangular closed loop;

FIG. 6 is a top plan view of an automobile window protector in which the strip of spring-like material is a generally oval closed loop;

FIG. 7 is a top plan view of an alternative embodiment of the automobile window protector of the invention;

FIG. 8 is a fragment perspective view of the automobile window protector of the invention attached to the windshield of an automobile;

FIG. 9 is a fragmented perspective view of the portion of FIG. 8 indicated;

FIG. 10 is a top plan view of part of the webbing shown in FIG. 9;

FIG. 11 is a top plan view of the webbing shown in FIG. 10 with the wind blowing the tab portion away from the webbing;

DESCRIPTION OF THE PREFERRED EMBODIMENTS

Figure 1:
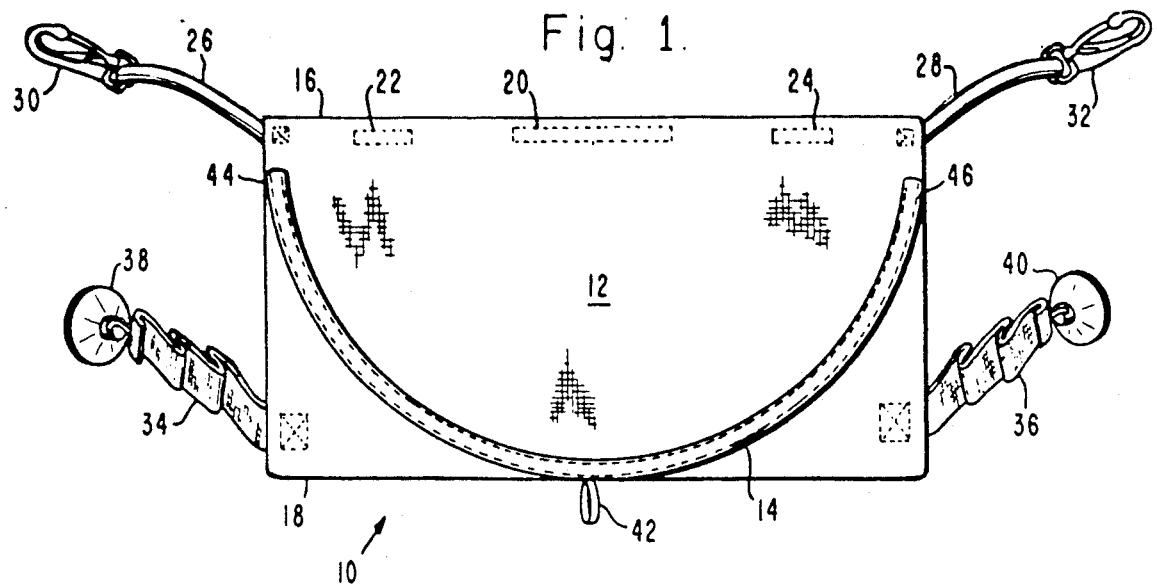
FIG. 1 is a top plan view of an automobile window protector in accordance with the invention.
Figure 2:
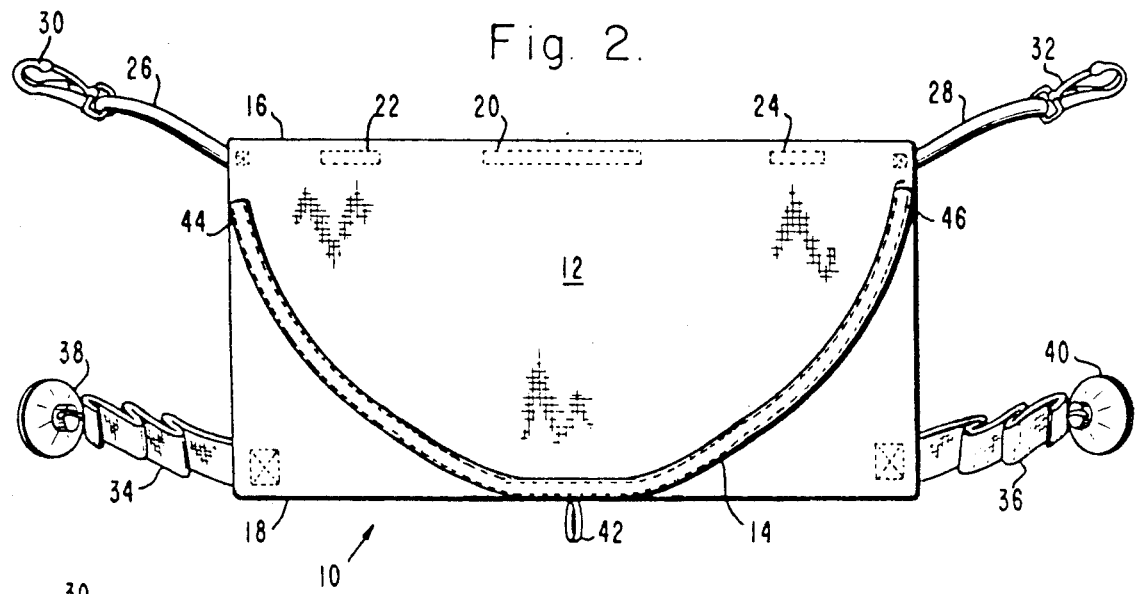
FIG. 2 is a top plan view of an automobile window protector in which the strip of spring-like material is arcuate with a flattened midsection.
Figure 3:
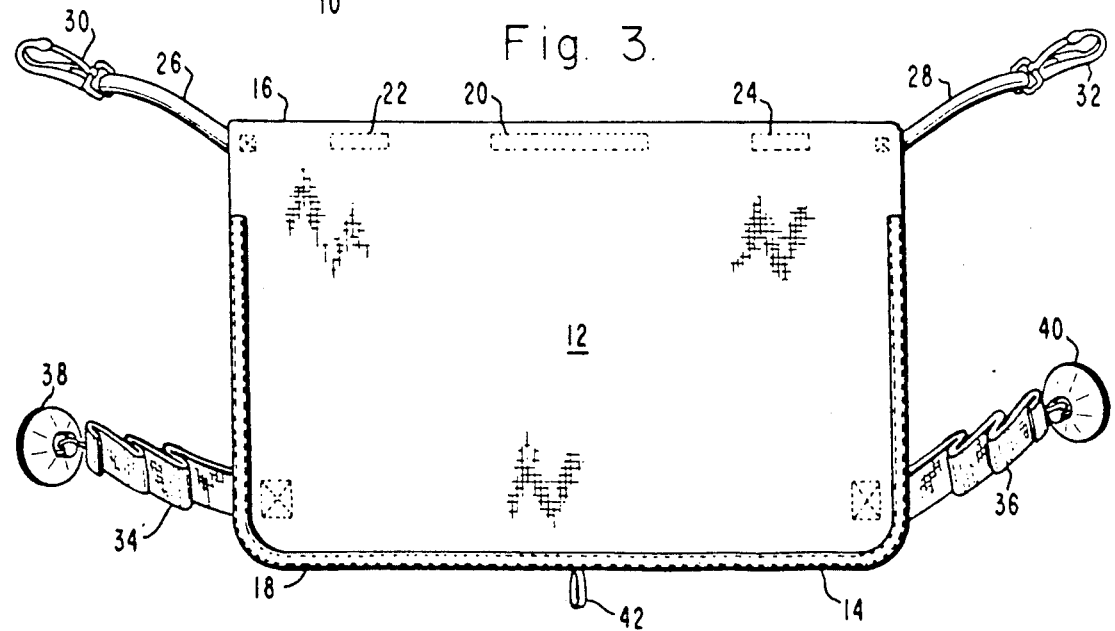
FIG. 3, is a top plan view of an automobile window protector in which the strip of spring-like material is generally U-shaped.

Referring to the figures of drawings wherein like reference numerals designate like elements throughout, FIGS. 1-18 depict embodiments of the automobile window protector of the present invention. For ease of illustration and description, the drawings illustrate only the pertinent features of the present invention and do not show the remaining conventional features.

Referring to FIG. 1, the preferred embodiment of the automobile window protector 10 of the present invention comprises a generally planar sheet 12 of one or more layers of flexible material such as cloth, plastic film, paper, or the like. The shape of sheet 12 is generally rectangular, but could also be trapezoidal, or have rounded corners. One or both planar surfaces of sheet 12 are made reflective, either by making sheet 12 of a white or light-colored material, or by a metallizing or some other suitable process.

A thin strip or wire 14 of a spring-like material is attached to sheet 12 along a curved path starting at or near one corner of a longer side 16 of sheet 12, continuing to the midpoint of the opposite longer side 18 of sheet 12, and curving back toward the other corner of side 16.

Strip 14 comprises a suitable metallic or plastic material. As shown in FIG. 1, strip 14 is under bending stress because of the curved shape it is constrained to assume. The open, extended configuration of window protector 10 shown in FIG. 1 is maintained by the spring restoring forces of strip 14 against the material of sheet 12.

As shown in FIGS. 2, 3, 4, 5, and 6, the curved strip or wire 14 can take on various alternate shapes including, but not limited to, an arcuate shape with a flattened midsection, a U-shape, a C-shape, and a closed-loop shape, either generally rectangular or oval. A prime consideration is that the sheet 12 be held in its desired open shape when the window protector 10 is not in its folded configuration. A variety of shapes of the strip 14 will suffice for this purpose.

By way of example, if sheet 12 comprises a single layer of material, strip 14 could be held in place underneath a curved strip of material sewn to the single layer of sheet 12. If sheet 12 were to comprise a double layer of material, strip 14 could be sewn into its curved position between the two layers of material.

An adjustable portion 20 of material centered on side 16 of sheet 12 allows the length of side 16 to be shortened if necessary for smaller windows. Adjustable portion 20 can comprise stretched elastic thread sewn to sheet 12 along the center part of side 16, or can comprise some sort of snap or velcro arrangement.

Short strips of flexible magnetic material 22 and 24 can optionally be attached to sheet 12 to assist in attaching window protector 10 to steel portions of the automobile. Connecting straps 26 and 28 are attached at either end of side 16 of sheet 12. At the ends of connecting straps 26 and 28 are connectors 30 and 32, which can take a variety of forms.

As shown in FIG. 1, connectors 30 and 32 are spring-loaded "C"-clips. Alternatively, other types of conventionally known clips or hooks could be used for connectors 30 and 32. Connectors 30 and 32 can be connected to the hinges of the sun visors above the windshield in the interior of an automobile.

On opposite sides of sheet 12 near side 18 are webbing straps 34 and 36, at the ends of which suction cups 38 and 40 are attached. At the midpoint of side 18 of sheet 12 a loop 42 of elastic material is attached. The function of loop 42 is to slip over and hold together sheet 12 when it is in a compact folded configuration.

One convenient method of folding sheet 12 into a compact configuration is to grasp ends 44 and 46 of strip 14, bring them towards and past each other, and around to form a generally circular shape of small radius consisting of overlapping segments of strip 14. Elastic loop 42 is then slipped over the circle of small radius and holds it together while loop 42 is stretched along a diameter of the circle.

Referring to FIGS. 2-6, it can be seen that other suitable shapes for strip 14 include an arcuate shape with a flattened midportion, a U-shape, a C-shape, a generally rectangular closed loop, and a generally oval closed loop.

Referring to FIG. 7, an alternative embodiment of automobile window protector 10 is shown. In this embodiment, ends 44 and 46 of strip 14 comprise mating connectors 48 and 50. When sheet 12 in this alternate embodiment is folded into its compact configuration as described above, connectors 48 and 50 are joined together and loop 42 is slipped over the circle of more than one turn which is thus formed.

FIG. 8 shows window protector 10 attached to the windshield 52 (shown in phantom outline) of an automobile 54. Doors 56 of automobile 54 are closed on webbing strips 34 and 36 which extend into the interior of automobile 54. Suction cups 38 and 40 on the ends of webbing strips 34 and 36 are attached to the inside surface of windshield 52. Connecting straps 26 and 28 also extend into the interior of automobile 54 and connectors 30 and 32 are clipped or hooked onto the automobile sun visors. In addition, flexible magnetic strips 22 and 24 serve to secure side 16 of sheet 12 against the roof of automobile 54.

FIG. 9 shows the details of webbing strip 36 and suction cup 40. An end 58 of the material of webbing strip 36 is sewn to sheet 12 near a bottom corner. There is a plurality of folded-over and sewn-together portions 60 of the material of webbing strip 36. The sewn-together parts of overlapping portions 60 extend only part way along the overlaps to leave tab-like end loops 62.

As shown in FIG. 10, overlapping portion 60 is sewn together only in region 64. Tab-like loop 62 is free to move away from webbing strip 36, as shown in FIG. 11. Webbing strip 36 is attached to suction cup 40 with an elastic strip 66, as shown in the figures of drawings.

As shown in FIG. 10, webbing strip 36 is under tension. In FIG. 11, tab 62, when blown away from strip 36 by the wind, increases the tension on strip 36 which tends to hold sheet 12 more securely against the automobile.

Figure 12:
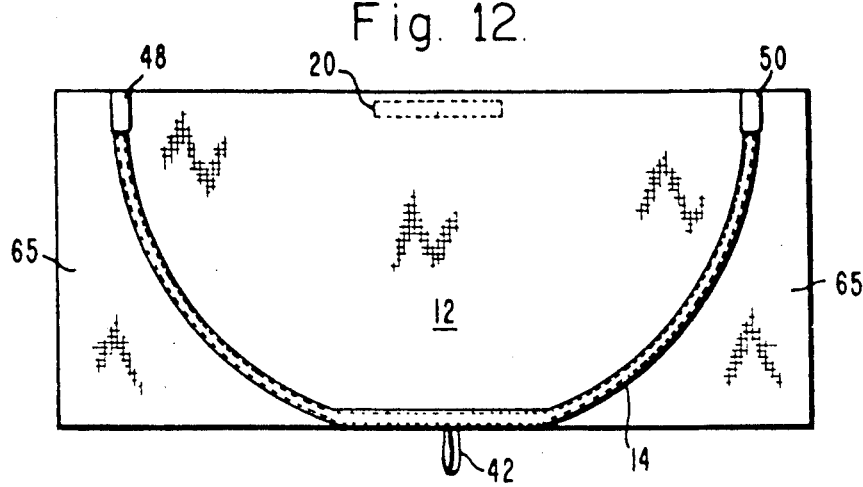
FIG. 12 is a top plan view of an automobile window protector having side panels extending beyond that part of the sheet containing the strip of spring-like material.

FIG. 12 shows a variation of automobile window protector 10 in which there are extra panels 65 of sheet 12 on either side of strip 14. The side panels 65 can be held by the closed doors of automobile 54.

Figure 13:
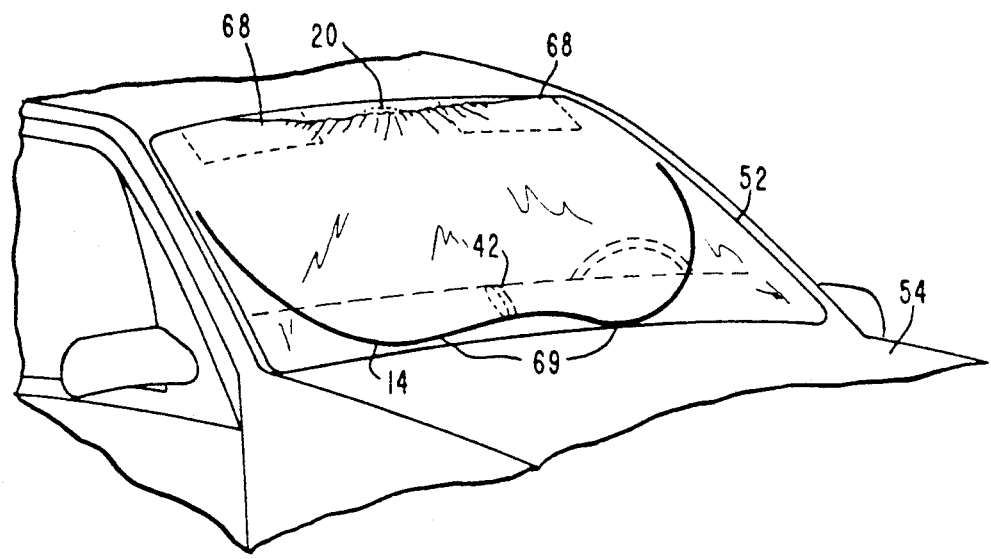
FIG. 13 is a fragmented perspective view of the automobile window protector installed on the inside of an automobile windshield.

Referring to FIG. 13, automobile window protector 10 is shown installed on the inside of automobile 54 next to windshield 52. Sun visors 68 are rotated downward from their stored position to hold window protector 10 in place against windshield 52. Adjustable portion 20 along side 16 of sheet 12 adjusts the size of window protector 10 to match the area of windshield 52. As seen in FIG. 13, there is a bunching up of material to shorten side 16 and accommodate the smaller windshield.

As shown in FIG. 13, there are two inflection points 69 in the curve of strip 14 when protector 10 is smaller than the windshield inside which it is placed. The spring restoring forces of strip 14 against the side and bottom surroundings of windshield 52 help to keep window protector 10 in place. Window protector 10 is arranged so that its reflective side faces outward toward windshield 52. Light and heat radiation from the sun passing through windshield 52 is thus prevented from reaching the interior portions of automobile 54. The materials making up the top of the dashboard, the seat upholstery, the steering wheel and steering column, and other parts of the interior are thus protected from the deleterious effects of sunlight and heat.

Figure 14:
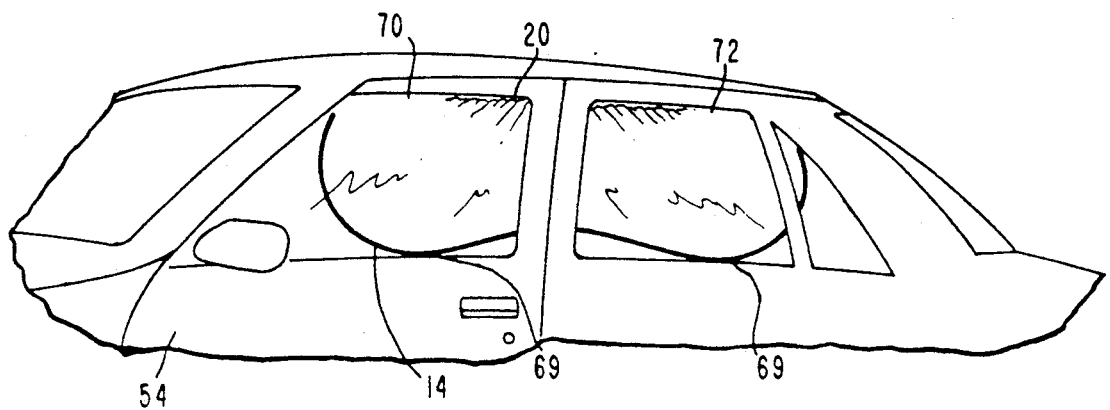
FIG. 14 is a fragmented perspective view of the automobile window protector installed inside along the side windows of an automobile.

In FIG. 14, window protector 10 is shown installed along the side windows 70 and 72 of automobile 54. As before, the spring restoring forces of strip 14 at its ends 44 and 46 and lower inflection points 69 serve to hold window protector 10 in place against the portions of automobile 54 surrounding windows 70 and 72.

Figure 15:
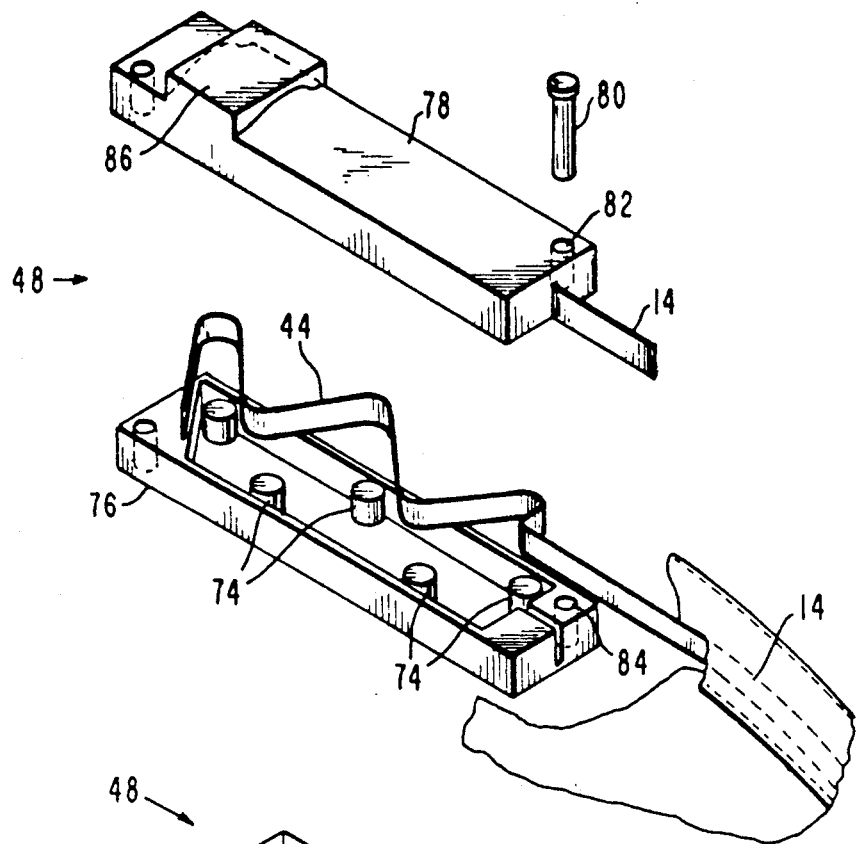
FIG. 15 is a fragmented exploded view of end connectors for the curved strip of spring-like material.

FIG. 15 shows details of one possible embodiment of an end connector 48 or 50. An end 44 of strip 14 is formed into a sinuously shaped portion which is held between a plurality of post-like projections 74 in a bottom piece 76 of connector 48. A top piece 78 of connector 48 fits over bottom piece 76 and is secured thereto by connecting pins or rivets 80 which are inserted through holes 82 in top piece 78 and lined-up holes 84 in bottom piece 76. Top piece 78 of connector 48 has a spring clip portion 86 on its top side. A connector 50 of substantially identical construction attached to the other end 46 of strip 14 can be mated with connector 48 by interdigitating the spring clip portions of the connectors. Top part 78 and bottom part 80 of connector 48 can be molded of a suitable plastic material, for example, and pins or rivets 80 can be either plastic or metal.

Figure 16:
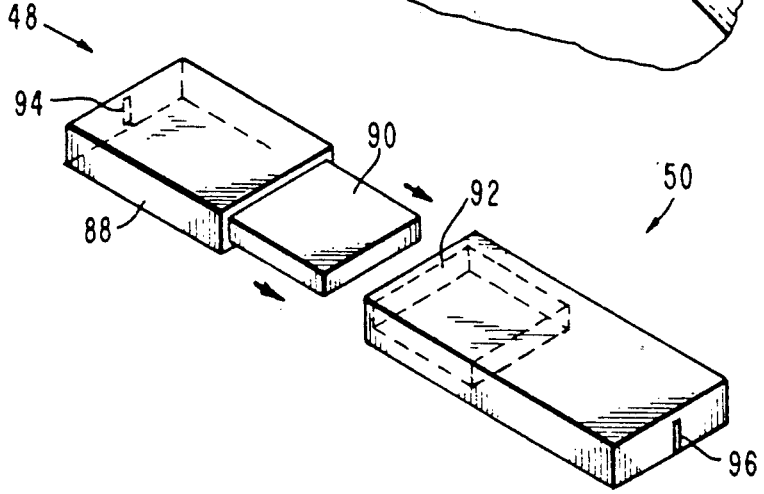
FIG. 16 is a perspective view of two mating end connectors which comprise a friction-fit post-and-receptacle type connection.

Referring to FIG. 16, end connectors 48 and 50 comprise a male connector 48 and a female connector 50. Male connector 48 is generally rectangular with a parallelepipedal portion 88 ending in a similarly shaped end portion 90 of smaller cross section. End portion 90 fits into a receptacle 92 of female connector 50. Slot 94 in portion 88 of male connector 48 allows passage of an end of strip 14 into the interior of portion 88 where an arrangement such as shown in FIG. 15 can be used to secure strip 14 to connector 48.

Referring again to FIG. 16, end portion 90 has a cross section which tapers slightly toward the distal end of end portion 90, so that end portion 90 can be inserted into receptacle 92 and be frictionally held therein. Slot 96 in female connector 50 allows passage of the other end of strip 14, which can be held in place in a manner similar to that shown in FIG. 15.

Figure 17:
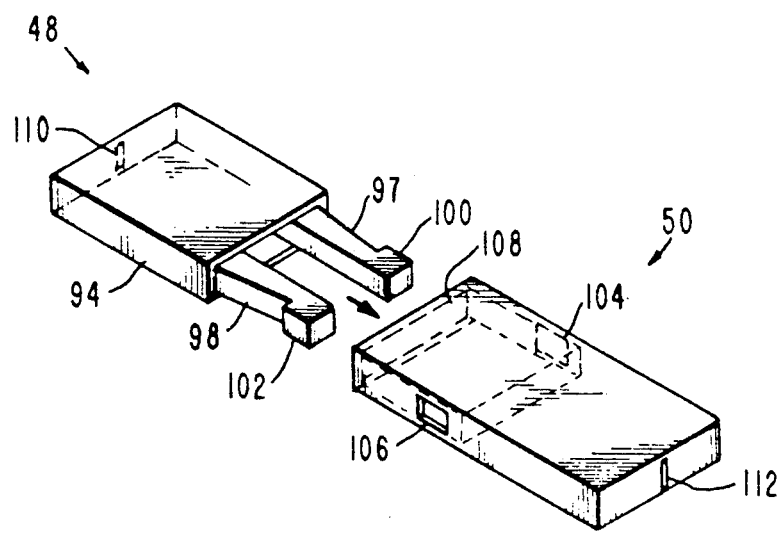
FIG. 17 is a perspective view of a pair of mating end connectors in which the male connector has two generally parallel members with lateral bumps that fit in side holes of the female connector.

Referring to FIG. 17, end connectors 48 and 50 in yet another embodiment comprise a male connector 48 and a female connector 50. Male connector 48 comprises a generally parallelepipedal portion 94 which ends in two generally parallel plug like members 97 and 98. Members 97 and 98 have lateral bumps 100 and 102 which fit into side holes 104 and 106 communicating with a receptacle 108 in female connector 50.

Male connector 48 is made of a resilient material, so that members 97 and 98 can be squeezed toward each other to allow their insertion into receptacle 108. Members 97 and 98 are slid further into receptacle 108 until they can spring apart when lateral bumps 100 and 102 move into side holes 104 and 106.

The exact shapes of members 97 and 98 are not critical, and alternatively, detents inside receptacle 108 corresponding to the positions of side holes 104 and 106 could also serve to hold connectors 48 and 50 together upon insertion of members 97 and 98 into receptacle 108. Slots 110 in male connector 48 and 112 in female connector 50 allow passage of the ends of strip 14 into the connectors for attachment thereto.

Figure 18:
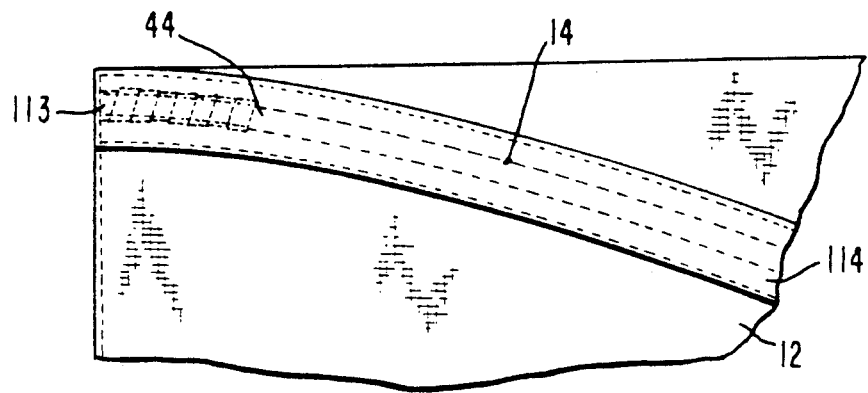
FIG. 18 is a fragmented plan view showing, in phantom, one end of the curved strip of spring-like material in the absence of an end connector.

Referring to FIG. 18, an end 44 of strip 14 is shown in an embodiment without mating end connectors. In this embodiment, end 44 is sheathed or wrapped in a plastic or rubber-like material 113 to prevent its wearing through the material of sheet 12 at an edge or a corner. Strip 14 is held in position against sheet 12 by a strip 114 of suitable material sewn onto sheet 12.

Figure 19:
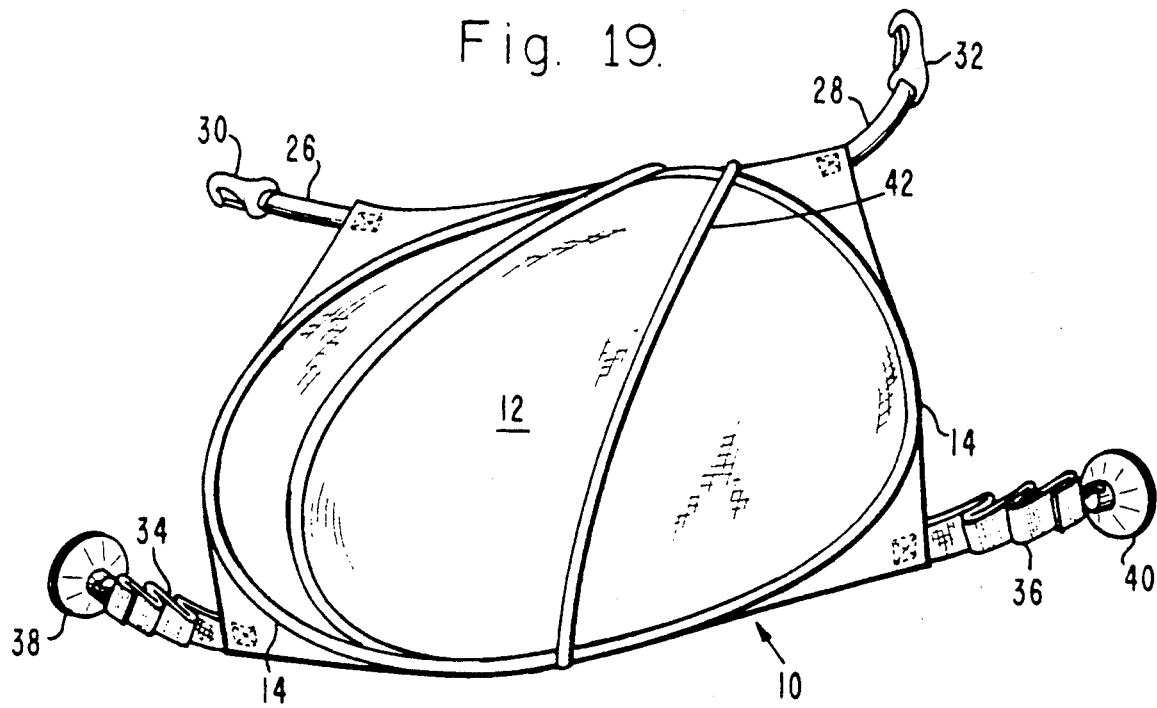
FIG. 19 is a top plan view of the automobile window protector in its compact folded configuration.

Referring to FIG. 19, the embodiment of automobile window protector 10 of FIG. 6 is depicted in a compact configuration which results from twisting strip 14 to create two adjacent layers of sheet 12 and stretching loop 42 over the two adjacent layers thus created to hold protector 10 in its compact configuration.

It should be understood that the invention in its broader aspects is not limited to the specific embodiments shown and described herein, but departures may be made therefrom within the scope of the appended claims without departing from the principals of the invention and without sacrificing its chief advantages. For example, there are a variety of different types of connectors known in the art which could be used for the end connectors 48 and 50. All such modifications and changes will make themselves apparent to those of ordinary skill in the art and all such changes and modifications are intended to be covered by the appended claims.

What is claimed is:

1. A compactly foldable automobile window protector for a window of an automobile comprising:
   a substantially planar quadrilateral sheet of at least one layer of a flexible first material, said sheet having front and back surfaces and having first and second opposed short sides and first and second opposed long sides;
   an elongate curved strip of a spring-like, elastically deformable second material attached to said sheet, extending from near said first short side to near said second short side, and having a middle portion near a midpoint of said second long side, said curved strip and sheet being capable of being folded into a compact configuration;
   retaining means attached to said sheet near a midpoint of said second long side, for retaining said protector in said compact configuration; and
   a plurality of attachment means joined to said sheet for attaching said sheet to said automobile adjacent to said window.

2. The automobile window protector of claim 1 wherein said front surface of said sheet comprises a material suitable for reflecting light and heat radiation from the sun.

3. The automobile window protector of claim 1 wherein said curved strip of spring-like material has an arcuate shape.

4. The automobile window protector of claim 1 wherein said curved strip of spring-like material has a generally arcuate shape with a flattened midportion of said strip.

5. The automobile window protector of claim 1 wherein said curved strip of spring-like material has a generally U-shaped configuration, with first and second straight side segments of said strip extending along said first and second short sides of said sheet.

6. The automobile window protector of claim 5 wherein said curved strip further comprises first and second straight end segments at first and second ends of said strip, said straight end segments being collinear, directed toward each other, and perpendicular to said first and second straight side segments of said strip.

7. The automobile window protector of claim 1 wherein said curved strip of spring-like material comprises a generally rectangular closed loop with rounded corners.

8. The automobile window protector of claim 1 wherein said curved strip of spring-like material comprises a generally oval closed loop.

9. The automobile window protector of claim 1 wherein said sheet further comprises a generally rectangular panel of said first material between said middle portion of said curved strip and said second long side of said sheet.

10. The automobile window protector of claim 1 further comprising means for foreshortening said first long of said sheet, wherein said means for foreshortening is attached to said sheet.

11. The automobile window protector of claim 1 further comprising magnetic means for attaching said sheet magnetically to said automobile, disposed near said first long side of said sheet and attached to said sheet.

12. The automobile window protector of claim 1 wherein said attachment means comprises:
   first and second straps of an elastic material connected to said sheet near first and second corners thereof at opposite ends of said first long side of said sheet;
   first and second substantially identical connector means attached to distal ends of said first and second straps, for connecting said first and second straps to said automobile;
   third and fourth straps connected to said first and second short sides of said sheet, respectively, near third and fourth corners of said sheet at opposite ends of said second long side; and
   third and fourth substantially identical connector means attached to distal ends of said third and fourth straps, respectively, for connecting said third and fourth straps to said automobile.

13. The automobile window protector of claim 12 wherein said first and second connector means comprise spring-loaded "C"-clips.

14. The automobile window protector of claim 12 wherein said third and fourth connector means each comprise a suction cup.

15. The automobile window protector of claim 12 wherein said third and fourth straps each comprise:
   a length of webbing strip including a plurality of folded-over, overlapping, and partly sewn-together portions leaving a plurality of tab-like end loops where said overlapping portions are partly sewn-together; and
   a length of elastic material joined to said webbing strip at said distal end thereof;
   wherein said tab-like portions are outside said window protector when said window protector is attached to the exterior of said automobile window;
   whereby said tab-like portions, when blown away from said webbing strip by the wind, increases the tension on said webbing strip exerted by said length of elastic material which tends to hold said window protector more securely against said automobile.

16. The automobile window protector of claim 1 further comprising first and second mating connector fittings attached to said first and second ends of said strip of spring-like material, whereby said first and second ends can be joined together when said window protector is folded into a compact configuration.

17. The automobile window protector of claim 16 wherein said first and second ends of said elongate strip each have a plurality of alternating sinuous bends therein, and each said mating connector fitting comprises:
   a top piece having a spring clip portion on one side thereof and having first and second holes through first and second end portions thereof;
   a bottom piece with a hollow recess therein, said recess having a substantially flat bottom with a plurality of posts projecting therefrom around which said bends of one of said ends of said elongate strip are disposed, and having first and second holes through first and second ends thereof and a slot through said first end to accommodate passage of a straight portion of said elongate strip; and first and second means for joining said top and bottom pieces by insertion of said means through said first and second holes of said top piece and said first and second holes through said bottom piece.

18. The window protector of claim 17 wherein each said means for joining said top and bottom pieces comprises a rivet.

19. The window protector of claim 17 wherein each said means for joining said top and bottom pieces comprises a rubber plug.

20. The window protector of claim 16 wherein said first and second mating connector fittings comprise:
- a male connector fitting having a body portion and a projecting end portion; and
- a female connector fitting having a receptacle in one end thereof with a cross sectional shape matching a cross sectional shape of said end portion of said male fitting;
- wherein said end portion of said male connector fitting can be frictionally engaged by said receptacle in said female connector fitting.

21. The automobile window protector of claim 20 wherein said cross sectional shape is generally rectangular.

22. The automobile window protector of claim 20 wherein said cross sectional shape is generally circular.

23. The automobile window protector of claim 16 wherein said first and second mating connector fittings comprise:
- a male connector fitting having a body part with two substantially parallel members projecting from one end thereof, each said member having a lateral bump facing outwardly from said male connector fitting; and
- a female connector fitting having a receptacle in one end thereof having a shape to accommodate insertion of said two parallel members, and further having side holes therein, each said hole having a shape substantially congruent to a shape of said lateral bump;
- wherein each said lateral bump is engaged in one of said side holes upon insertion of said parallel members into said receptacle.

24. The automobile window protector of claim 16 wherein said first and second mating connector fittings comprise:
- a male connector fitting having a body part with two substantially parallel members projecting from one end thereof, each said member having a lateral bump facing outwardly from said male connector fitting;
- a female connector fitting having a receptacle in one end thereof having a shape to accommodate insertion of said two parallel members, and further having detents in inner sides of said receptacle, each said detent having a shape substantially congruent to a shape of said lateral bump;
- wherein each said lateral bump is engaged in one of said detents upon insertion of said parallel members into said receptacle.

* * * * *